US007716433B2

(12) United States Patent
Dutta et al.

(10) Patent No.: US 7,716,433 B2
(45) Date of Patent: May 11, 2010

(54) DYNAMICALLY DETERMINING AND MANAGING A SET OF TARGET VOLUMES FOR SNAPSHOT OPERATION (75) Inventors: Kala Dutta, San Jose, CA (US); Neeta Garimella, San Jose, CA (US); James P. Smith, Redwood City, CA (US); Choonsu P. Park, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/355,412

(22) Filed: Feb. 16, 2006

(65) Prior Publication Data
US 2007/0192552 A1 Aug. 16, 2007

(51) Int. Cl.
*G06F 12/00* (2006.01)
(52) U.S. Cl. .................... 711/162; 711/114; 707/204; 714/3; 714/6; 714/7; 714/8
(58) Field of Classification Search .................. None
See application file for complete search history.

(56) References Cited
U.S. PATENT DOCUMENTS
6,175,904 B1 * 1/2001 Gunderson ................. 711/162

| | | | | |
|---|---|---|---|---|
| 6,826,666 B2 * | 11/2004 | Berkowitz et al. | .......... | 711/162 |
| 2003/0051109 A1 * | 3/2003 | Cochran | ................ | 711/162 |
| 2003/0093509 A1 * | 5/2003 | Li et al. | ............... | 709/223 |

* cited by examiner

*Primary Examiner*—Christian P Chace
*Assistant Examiner*—Alan Otto
(74) *Attorney, Agent, or Firm*—Canady & Lortz LLP; Bradley K. Lortz (57) ABSTRACT

Systems and methods for managing a backup process of a database are disclosed. Typically, one or more backup logical unit numbers (LUNs) are identified in a backup management file from one or more available LUNs identified in a universe file are allocated. The backup management file comprises a plurality of data containers, each data container specifying a subset of the one or more backup LUNs capable of backing up a database comprising one or more used database LUNs. One of the plurality of the data containers are allocated for a current backup of the database as indicated in the backup management file. The backup management file is checked and updated as necessary so that the one or more backup LUNs remain available as indicated in the universe file.

18 Claims, 5 Drawing Sheets

DYNAMICALLY DETERMINING AND MANAGING A SET OF TARGET VOLUMES FOR SNAPSHOT OPERATION

BACKGROUND OF THE INVENTION

1. Field of the Invention

This invention relates to systems and methods for computer storage. Particularly, this invention relates to systems and methods for dynamically determining and managing multiple volumes in a data backup system.

2. Description of the Related Art

Storage management systems are increasingly relying on exploiting storage subsystems and storage subsystem technologies to backup and restore data in a fast, non-intrusive manner. One example is found in the product suite of IBM Tivoli Data Protection For Hardware which utilize IBM Enterprise Storage Server (ESS) subsystems to create backups for databases and applications such as DB2, ORACLE and mySAP. A primary characteristic of this data is that it is typically managed outside of the context of the traditional storage management server, e.g., outside of the context of the TIVOLI storage manager server. In other words, the storage is generally not seen or controlled by the backup server.

One of the first tasks for a user of such a system is to describe the storage that is available from the storage subsystem for use by the local storage management client. For example, the user may have fifty logical unit numbers (LUN) which can be dedicated to the backup application and must be made known to the backup application. Another task for the user is to create a correspondence between a LUN which contains production data (i.e. a source LUN) and another similar LUN (e.g., identical in size and possibly other characteristics) that can contain the backup (i.e. a target LUN). These backups are usually the result of a hardware copy operation (e.g., FlashCopy) from a source LUN to a target LUN.

The original IBM TIVOLI data protection for hardware products introduced the concept of a FlashCopy target file (usually denoted as ".fct" file). The original .fct files were simple text files that comprised one or more pairs of ESS serial numbers. The first serial number in the pair represented a database/application source LUN and the second number represented a target LUN for a FlashCopy operation. When the backup application determined that application data was stored on a source LUN, it would search through the file for the entry which listed the source LUN serial number and chose the paired target LUN serial number as the recipient of the FlashCopy operation. This technique has several drawbacks.

For example, one drawback is that the user must have explicit knowledge (identifying number and size) of which source LUNs are being used by the database application. This means that the user would have to ask the database and/or storage administrator for a list of the LUNs currently being used by the database.

Another drawback is that the target LUN must be preassigned to backup host outside of the context of the backup application. The user would need to determine which host would be used for the backup operation and ensure that the target LUN were already preassigned to that host.

Furthermore, the source-target LUN pairs must be prematched by the user. The user would have to know the requirements for matching source-target LUN pairs based on the storage subsystem. For example, the particular IBM ESS subsystem being used requires that either the source and target LUNs be equal in size or the source and target LUNs must be controlled by the same logical control unit which was represented in part of the LUN serial number.

Also, the user must be explicitly aware when the list of source LUNs changes and any changes to the source LUN set must be reflected back in the file. An example of these requirements is that if a DB2 database grows and is using more source LUNs, the user must be aware that this happened and enter a source-target LUN pair for the new source LUN in the .fct file. In addition, conventional systems are also constrained because the source LUN can be associated with only one target LUN and the .fct file allows for only a single backup version to be managed.

One improvement was made to the .fct file when the data protection products began to allow and manage multiple backup copies and the concept of a data container was introduced. The data container was basically a way to group a set of source and target LUN pairs into a logical set. A source LUN serial number could appear in multiple data containers, each entry having a unique LUN pair. With this format, when the backup application would request a container which represented a set of LUN which could contain a backup. The backup application managed the usage of these data containers in such a way that a subsequent request for a data container would yield a different set of source and target LUN pairs which would describe a second copy of the backup data. Unfortunately, this system only addressed the problem of being limited to a single backup version.

In view of the foregoing, there is a need in the art for systems and methods for storage management where the user need not have explicit knowledge (identifying number and size) of the source LUNs. There is also a need in the art for such systems and methods where the target LUN need not be preassigned to backup host outside of the context of the backup application. Further, there is a need for such systems and methods where the source-target LUN pairs need not be pre-matched by the user. As detailed hereafter, these and other needs are met by embodiments of the present invention.

SUMMARY OF THE INVENTION

Embodiments of the present invention remove the knowledge of the source LUN serial numbers and their relationship to target LUN or to database applications from the user. With embodiments of the invention, the user is only required to provide a set of target LUN serial numbers as input. (Note that embodiments of the invention also encompass a programmatic solution to allow automatic detection of target LUN serial numbers from a pool of LUN). The data protection application still uses the traditional .fct file as before the, but .fct file is generated dynamically from the user input as needed. Thus, the system addresses the problems previously described.

The user only needs to create a list of target LUN serial numbers without knowledge of the number of source LUN or the sizes (or any other characteristics) of the source LUN used by database. The user input file can be easily replaced by hardware management software which allocates a group of LUN for a backup application to use. In addition, the backup hosts can be programmatically determined and assigned so that the user does not have to worry about backup host assignment. The user can also easily add additional target LUN as input to the universe file and be buffered from any dynamic growth in the set of application source LUN. The LUN do not have to be pre-matched by the user. Furthermore, embodiments of the invention still allow for multiple backup versions.

A typical embodiment of the invention comprises a computer program embodied on a computer readable medium including program instructions for allocating one or more backup LUNs identified in a backup management file from one or more available LUNs identified in a universe file and program instructions for allocating one of the plurality of the data containers for a current backup of the dataset. The backup management file comprises a plurality of data containers, each data container specifying a subset of the one or more backup LUNs capable of backing up a dataset comprising one or more used dataset LUNs. Thus, the LUNs are programmatically determined and assigned so that a user need not manually assign the backup hosts. A user may simply add one or more additional available LUNs to the universe file (without having to determine their allocation in the backup process).

Allocating the one or more backup LUNs and allocating the one of the plurality of the data containers for the current backup of the dataset are typically performed in response to a backup request, e.g. from a user. Initially, allocating the one or more backup LUNs comprises creating the backup management file. In further embodiments, the data containers may be substantially equivalent in size, one example criteria for allocating the optimum match for a backup. The backup management file may also include one or more free LUNs from the one or more available LUNs identified in the universe file.

In some embodiments, program instructions for specifying current status of each of the data containers in the backup management file are included where the current status specifies whether the data container is in use. Allocating the one or more backup LUNs may comprise determining that the one or more backup LUNs are still currently identified in the universe file.

Further embodiments include program instructions for querying the dataset comprising the one or more used dataset LUNs to determine a dataset size of the one or more used dataset LUNs and allocating the one or more backup LUNs based on the dataset size and a backup size of each of the available LUNs. The universe file includes an identifier of each of the one or more available LUNs which is used by the program instructions to determine the sizes of the one or more available LUNs.

Still further embodiments may include program instructions for scanning a storage area network to identify the one or more available LUNs and generate the universe file. This automates generation of the universe file. Alternately, the one or more available LUNs to be applied in the universe file may be derived from hardware management software which allocates a group of LUNs for applications or systems.

Similarly, a typical method of the invention comprises programmatically allocating one or more backup LUNs identified in a backup management file from one or more available LUNs identified in a universe file and programmatically allocating one of the plurality of the data containers for a current backup of the dataset. The backup management file comprises a plurality of data containers, each data container specifying a subset of the one or more backup LUNs capable of backing up a dataset comprising one or more used dataset LUNs. The method may be further modified consistent with program embodiments described.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the present invention eliminate the requirement that the user must have knowledge of the source LUNs and their relationship to target LUNs or to database applications. The user is only required to provide a set of target LUN serial numbers as input. In addition, further embodiments of the invention also encompass a programmatic solution to allow automatic detection of target LUN serial numbers from a pool of LUN. The data protection application may still employ the backup management file (e.g. the .fct file) as before, but the backup management file is generated dynamically from the user input as needed. Thus, embodiments of the invention address the problems previously described.

Typically, one or more backup logical unit numbers (LUNs) are identified in a backup management file from one or more available LUNs identified in a universe file are allocated. The backup management file comprises a plurality of data containers, each data container specifying a subset of the one or more backup LUNs capable of backing up a database comprising one or more used database LUNs. One of the plurality of the data containers are allocated for a current backup of the database as indicated in the backup management file. The backup management file is checked and updated as necessary so that the that one or more backup LUNs remain available as indicated in the universe file.

Figure 1:
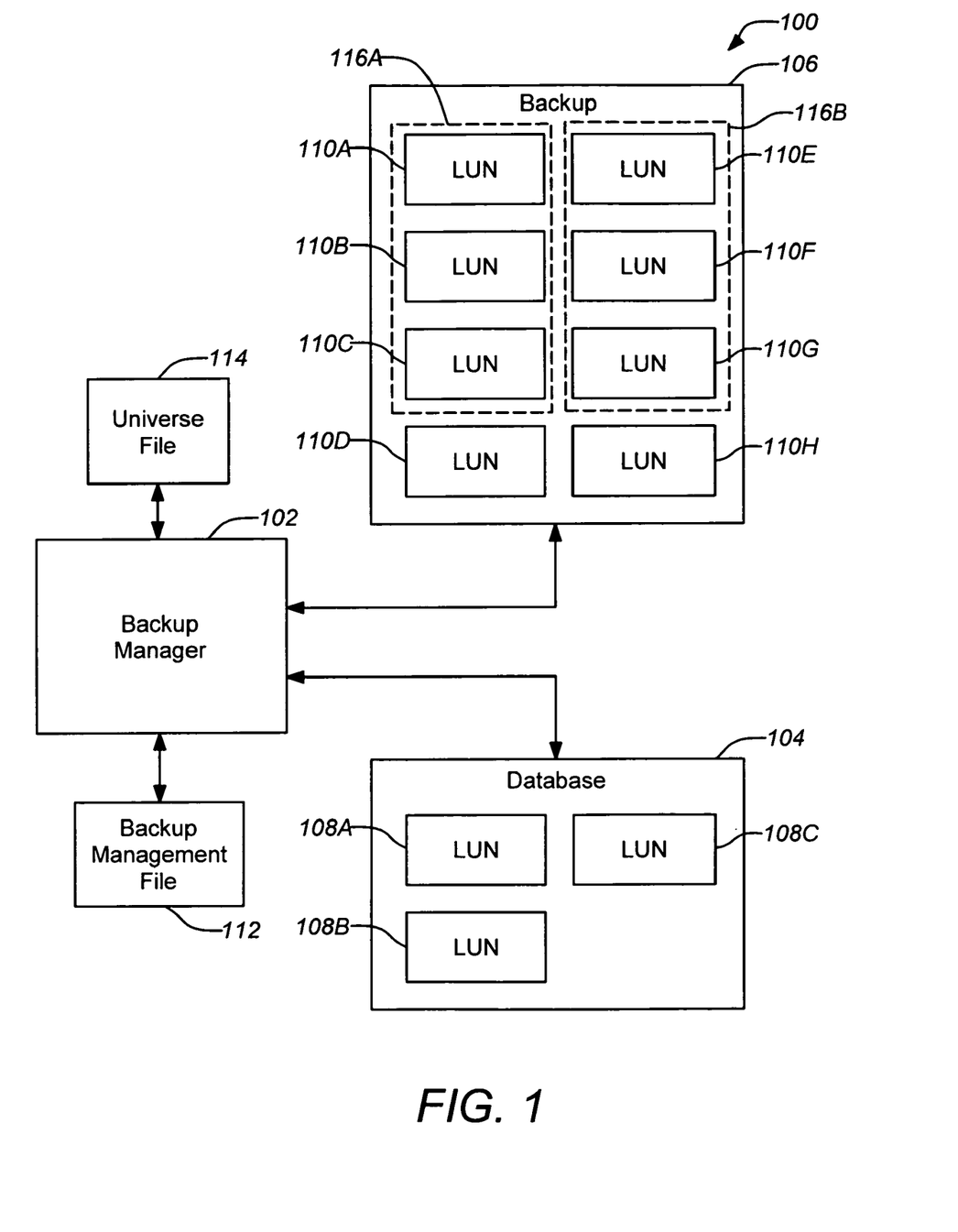
FIG. 1 is a functional block diagram of an exemplary embodiment of the invention.

FIG. 1 is a functional block diagram of an exemplary embodiment of the invention. The exemplary storage area network (SAN) 100 includes a backup application 102 which coordinates control of a database 104 and a backup storage 106. The database 104 includes a first plurality of logical storage devices 108A-108C that are each identified with a unique LUN. Similarly, the backup storage 106 includes a second plurality of logical storage devices 110A-110H that are also each identified with a unique LUN. The second plurality of logical storage devices 110A-110H are identified along with their operating parameters (e.g. size) in a universe file 114 accessible by the backup manager 102. The backup application 102 coordinates control of the storage and backup operations through the use of a backup management file 112 (a .fct file) that is used to coordinate the operating parameters of the database 104 and backup storage 106 (including the LUNs for the first and second logical storage devices 108A-108C, 110A-110H).

The backup application 102 allocate one or more of backup LUNs of the backup storage 106 for a current backup of used logical storage devices 108A-108C of the database 104 are performed in response to a backup request. Allocating the backup LUNs is effected through the backup management file 112 by assigning the backup LUNs to a plurality of data containers 116A, 116B identified in the file 112. The backup LUNs are allocated such that each data container 116A, 116B can support a complete backup of the database 104. The backup management file 112 is dynamically updated each time a backup is requested without requiring a user to manually identify and/or allocate the available backup LUNs. The backup management file 112 also tracks whether a particular data container and any remaining are free. For example, after a backup is performed using the first data container 116A, the second data container 116B as well as the unused LUNs 110D and 110H may be tagged in the backup management file 112 as "free." Although, embodiments of the invention emphasize software system level control, it is important to frame the software system within a physical hardware environment as described in the following section.

2. Hardware Environment

Figure 2A:
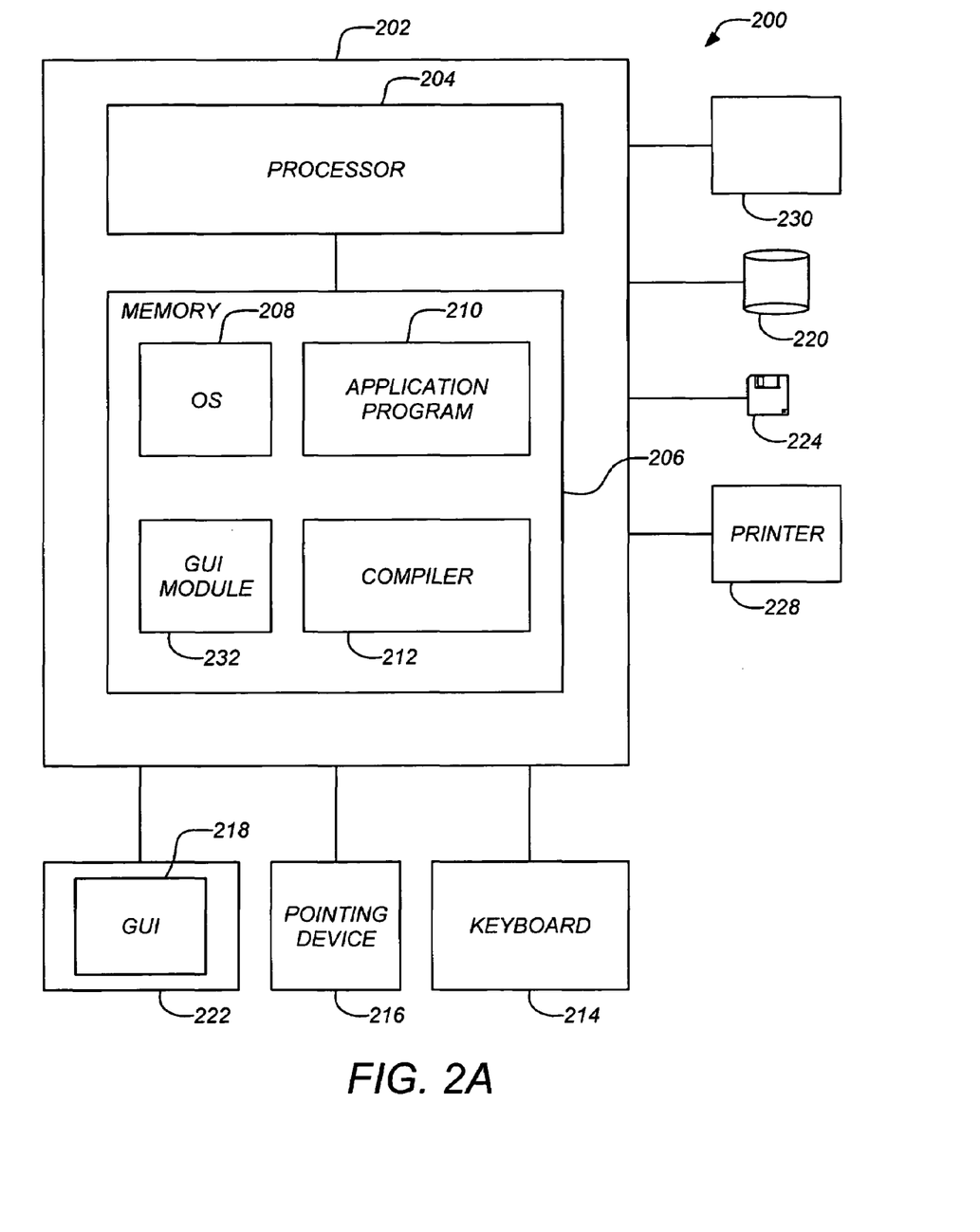
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, floppy disc 224, hard drive, DVD/CD-rom, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that manages devices over a network, such as storage and backup devices. The program 210 may operate within a single computer 202 or as part of a distributed computer system comprising a network of computing devices. The network may encompass one or more computers connected via a local area network and/or Internet connection (which may be public or secure, e.g. through a VPN connection).

Figure 2B:
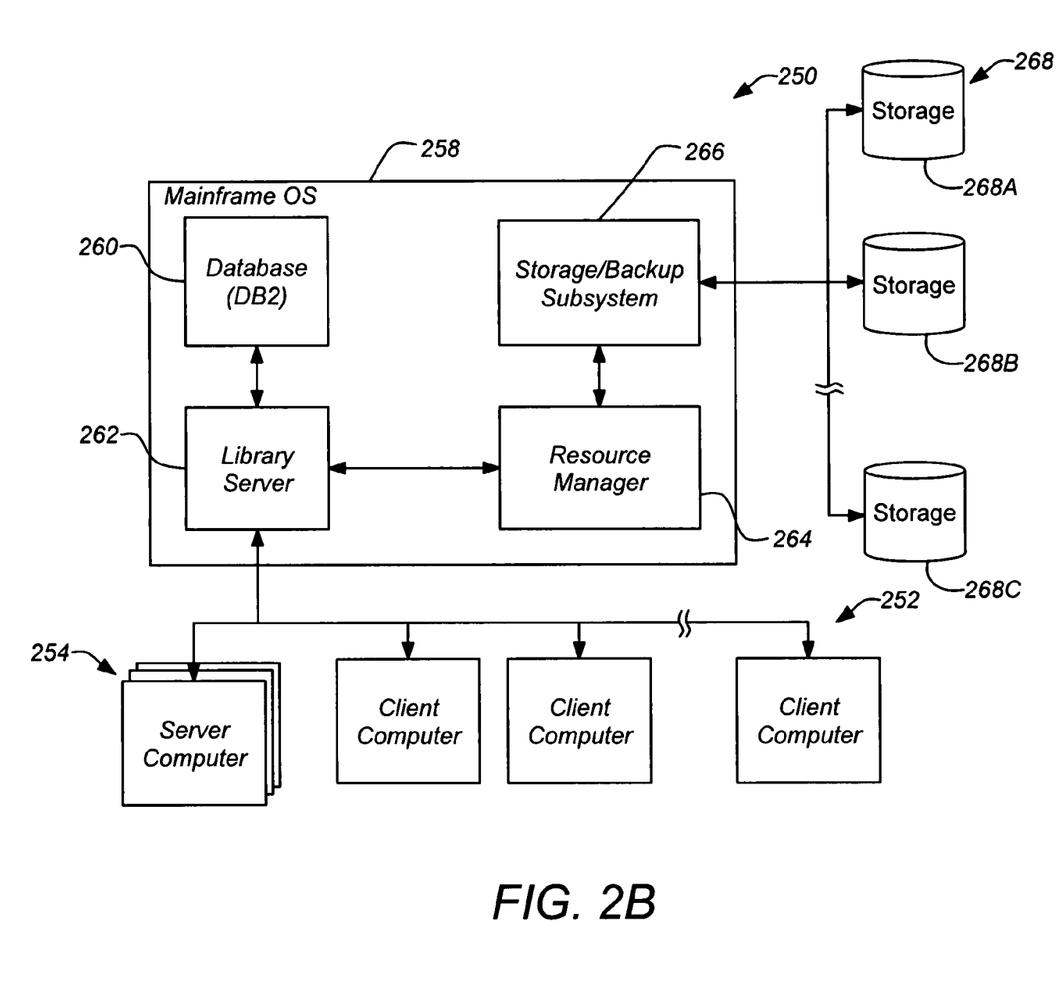
FIG. 2B illustrates a typical distributed computer system which may be employed in an typical embodiment of the invention.

FIG. 2B illustrates a typical distributed computer system 250 which may be employed in an typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example one or more hosts may be a mainframe computer 258 where significant processing for the client computers 256 may be performed. The mainframe computer 258 may comprise a database 260 which is coupled to a library server 262 which implements a number of database procedures for other networked computers 202 (servers 254 and/or clients 256). The library server 262 is also coupled to a resource manager 264 which directs data accesses through storage/backup subsystem 266 that facilitates accesses to networked storage devices 268 comprising a SAN (such as shown in FIG. 1). The SAN includes devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

As is well known in the art, logical unit numbers (LUNs) are employed in a network of devices, e.g. through the small computer standard interface (SCSI), to access and manage networked computer devices, such as storage devices. Commonly, a LUN is a unique identifier used on a SCSI bus to distinguish between devices that share a common bus. Originally, SCSI was a parallel interface that allowed up to sixteen devices to be connected along a single cable. The cable and the host adapter form the SCSI bus that operates independent from the rest of the computer. It is necessary for the LUN to be unique among all the devices that are visible to each other. Although, the single physical cable made this very simple for the original SCSI interface, with the application to larger SANs, the management of multiple physical and logical devices is much more complicated.

Devices that request I/O processes may be called sources. Targets are devices that perform operations requested by the sources. Each target can accommodate other devices that are each assigned an LUN. Commands that are sent to the SCSI controller identify devices based on their LUNs.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Dynamically Determining and Managing a Set of Target Volumes

Figure 3A:
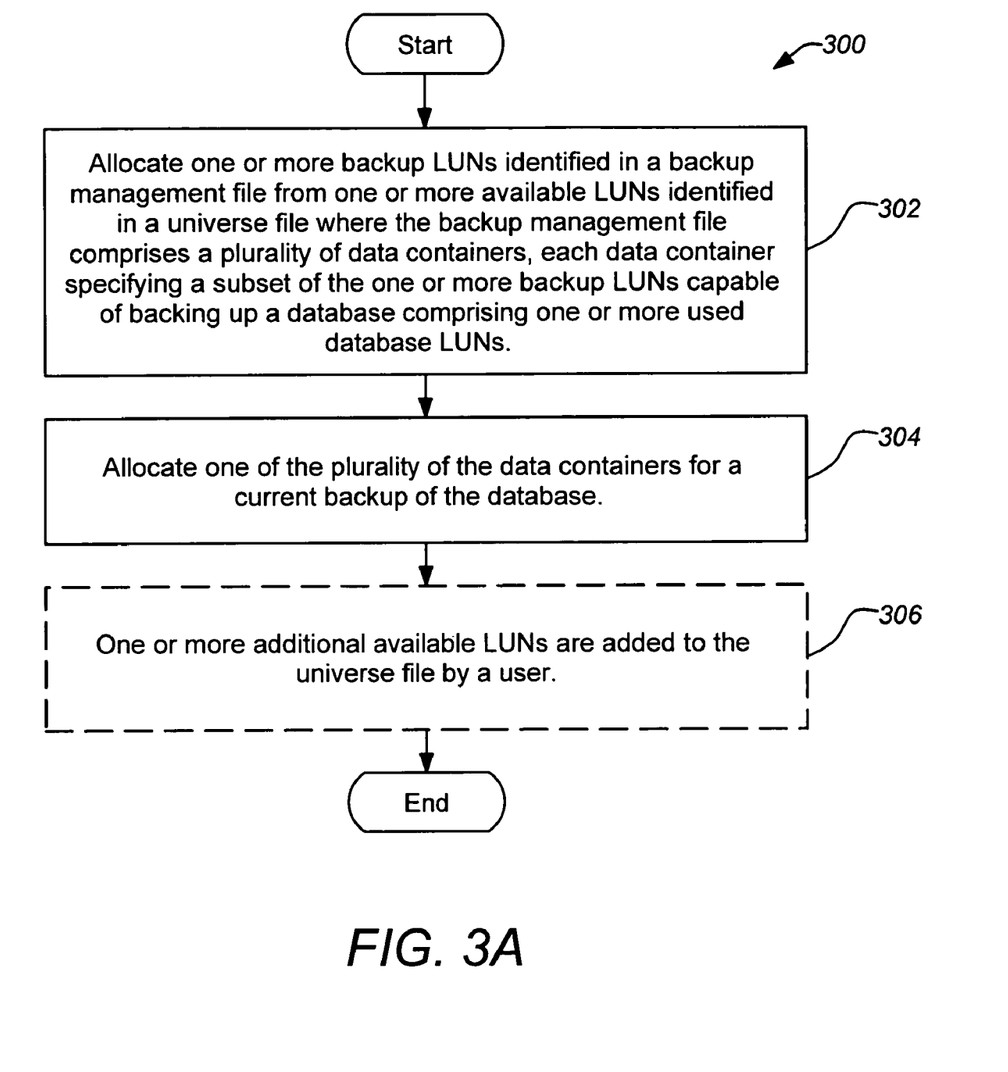
FIG. 3A is a flowchart of an exemplary method of the invention.

Various embodiments of the invention are facilitated through the use of a coordinating information source for accessing volumes in a backup system. For example, the user can create a simple text file which describes all LUN that are available for the backup application. This file may be referred to as the "universe of LUN" or "universe" file. Although any number of LUN are possible, FIG. 3A is a flowchart of an exemplary method 300 of the invention. The method begins by allocating one or more backup LUNs identified in a backup management file from one or more available LUNs identified in a universe file in operation 302. In operation 304, one of the plurality of the data containers are allocated for a current backup of the database. The backup management file comprises a plurality of data containers, each data container specifying a subset of the one or more backup LUNs capable of backing up a database comprising one or more used database LUNs. In addition, in operation 306 one or more additional available LUNs are added to the universe file by a user. Operation 306 is optional and encompasses the user's minimal interaction in allocating the LUNs for a backup; a user is buffered from any dynamic growth in the set of application source LUN and need not prematch LUN for the backup process as previously.

The data containers are substantially equivalent in size and the current status of each of the data containers is specified in the backup management file. For example, the status of a data container may indicate whether the LUNs of the data container are "in use" or "free". In addition, other free LUNs (not associated with a data container) from the one or more available LUNs identified in the universe file may also be specified in the backup management file.

Figure 3B:
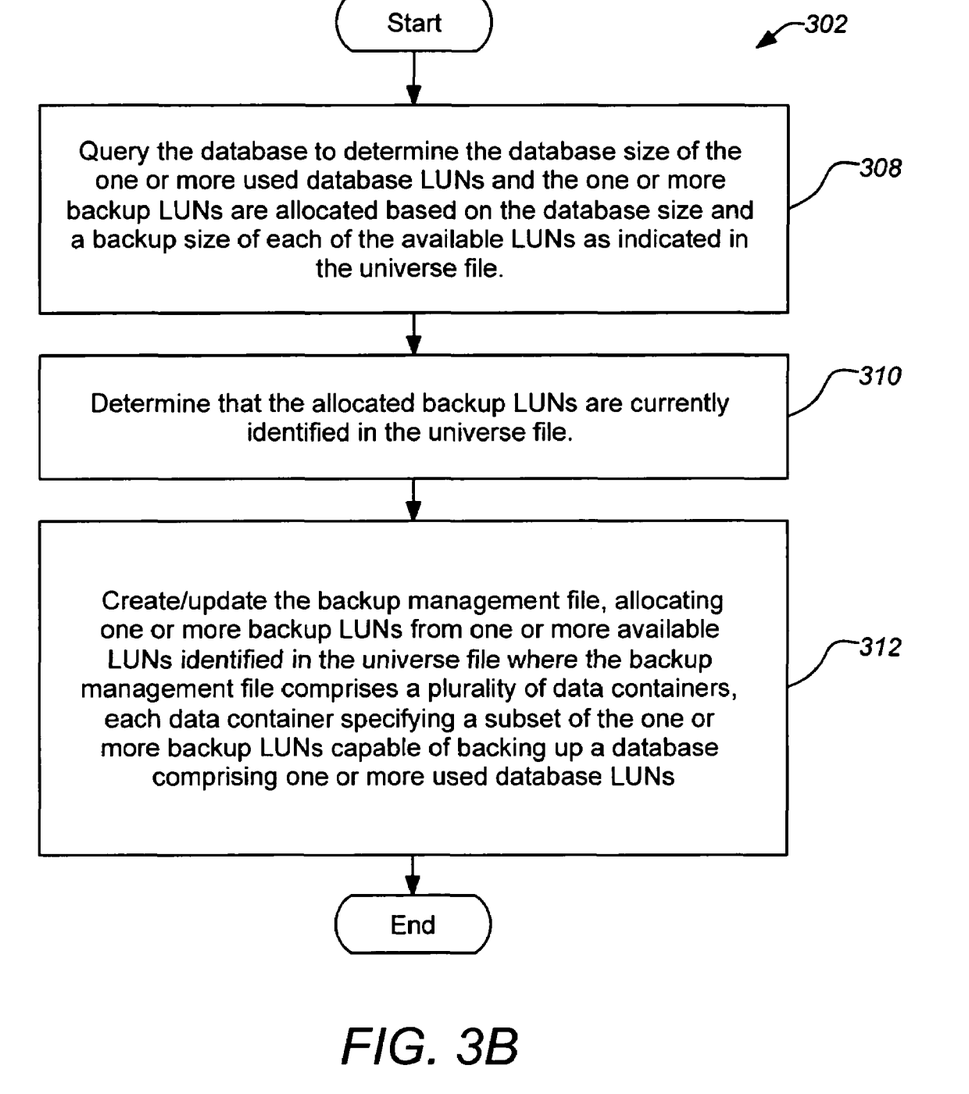
FIG. 3B is a flowchart of optional sub-operations for allocating the one or more backup LUNs in the method.

FIG. 3B is a flowchart of detailed sub-operations for allocating the one or more backup LUNs in the exemplary method 300. For example, in operation 308 the database is queried to determine the database size of the one or more used database LUNs and the one or more backup LUNs are allocated based on the database size and a backup size of each of the available LUNs. The universe file includes an identifier of each of the one or more available LUNs which is used by the program instructions to determine the sizes of the one or more available LUNs. In operation 310, it is determined that the one or more backup LUNs are currently identified in the universe file. This is done in order to confirm the validity of the current set of LUNs for the backup. In operation 312 the backup management file is updated/created, allocating one or more backup LUNs from one or more available LUNs identified in the universe file where the backup management file comprises a plurality of data containers, each data container specifying a subset of the one or more backup LUNs capable of backing up a database comprising one or more used database LUNs. Operations 308, 310, 312 may be performed as sub-steps of allocating the one or more backup LUNs.

Operation of a specific example according to an embodiment of the invention can be described as follows. In this example, the universe file has eight target LUN, labeled t01 to t08, and the data protection product performs backups of a DB2 database which has data spread over three source LUNs, identified as s01 to s03. To begin, the user can initiate a backup of a database (e.g. a DB2 database). In response, the backup application first queries the database and determines the LUN parameters of the database, e.g. that there is data on a plurality of source LUNs and the characteristics of those LUNs (e.g, size, controller, etc).

Next, the backup application reads the one or more user universe files, describing all LUN that are available for the backup application, and creates an .fct file comprising two data containers (e.g., that can be identified as DC1 and DC2). In this example, each data container comprises three target LUN which are capable of accommodating a complete backup of the database, DC1=t01-t03 and DC2=t04-t06. The LUN characteristics (e.g., size) are used in the context of the storage subsystem rules for matching to create the matching data containers. The remaining two LUN, t07 and t08, are marked as free in the .fct file.

The backup consumes the LUN in DC1 for the target of a copy operation (e.g. a FlashCopy). After the backup is created, the .fct file reflects DC1 as "in-use", DC2 as "free" and the other two target LUN also as "free".

After the user initiates a backup of the DB2 database, a reconciliation may be made between the information stored in the local backup storage and data being tracked by the backup server. The reconciliation may change the contents of the .fct file, e.g., it may determine that a backup is no longer being tracked by the backup server and mark the relevant data containers as free.

The backup application then queries the DB2 database and determines that there is data on the three source LUN and the characteristics of those LUN (e.g, size, controller, etc). The backup application reads the user universe files and the current .fct file. It determines that the contents of the current .fct file are still valid in the context of the universe file (e.g., it ensures that the user did not remove a LUN from the universe file which was represented as a LUN being currently used by an active data container). Again, the LUN characteristics (e.g., size) are used in the context of the storage subsystem rules for matching to create the matching data containers. At this point the regeneration would yield the same contents of the .fct file as when the backup previously consumed the LUN in DC1 for the target of a copy operation.

The backup again consumes the LUN in DC2 for the target of a copy operation (e.g. again a FlashCopy). After the backup is created, the .fct file reflects DC1 as "in-use", DC2 as "in-use" and the other two free target LUN.

After the user initiates a backup of the DB2 database, reconciliation between local and backup server managed storage occurs. The backup application queries the DB2 database and determines that there is data on the three source LUN and the characteristics of those LUN (e.g, size, controller, etc).

The backup application then reads the user universe files and the current .fct file. It may first determine that the contents of the current .fct file are still valid in context of the universe file (e.g., ensure that the user did not remove a LUN from the universe file which was represented as a LUN being currently used by an active data container). Again, the LUN characteristics (e.g., size) are used in the context of the storage subsystem rules for matching to create the matching data containers. At this point the regeneration would yield the same contents of the .fct file as after the second time a backup was created, e.g. the .fct file reflects DC1 as "in-use", DC2 as "in-use" and the other two free target LUN.

At this point, the backup application may take one of many steps because there are no available data containers to hold the backup of the DB2 database. For example, the backup application may free contents of DC1 in order to make available a data container for consumption of the backup operation. The resulting .fct file then reflects DC1 as "free", DC2 as "in-use" and the other two free target LUN.

The backup once again consumes the LUN in DC1 for the target of a copy operation (e.g. a FlashCopy). Here also, after the backup is created, the .fct file reflects DC1 as "in-use", DC2 as "in-use" and the other two free target LUN.

When the DB2 database grows to occupy a new source LUN, e.g. s04, an adjustment is made as follows. When the user initiates a backup of the DB2 database, reconciliation between local and backup server managed storage again occurs.

The backup application reads the user universe files and the current .fct file. It first determines that the contents of the current .fct file are still valid in context of the universe file (e.g., ensure that the user did not remove a LUN from the universe file which was represented as a LUN being currently used by an active data container. Again the LUN characteristics (e.g., size) are used in the context of the storage subsystem rules for matching to create the matching data containers. At this point the regeneration yields a .fct file that reflects DC1 as "in-use", DC2 as "in-use" and the other two free target LUN.

At this point, the backup application can take one of many steps because there are no available data containers to hold the backup of the DB2 database. This is also subject of other invention disclosures and is not discussed in detail. Assume that it frees the contents of DC2 in order to make available a data container for consumption of the backup operation. The .fct file is created as before but this time yields DC1 (t01-t03 in-use); DC2 (which is now defined as t04-t07) and LUN t08 is still free.

The backup then consumes the LUN in DC2 for the target of the copy operation (e.g., a FlashCopy). Following this logic through the backup, the .fct file generation frees DC1 and re-define it as LUN t01-t03 and t08 (to match the DB2 database which has four source LUN) and consume DC1 for the backup.

As will be understood by those skilled in the art, through application of the invention, the user is never required to modify the universe file or manage or even be aware of any of the specific changes caused by the database expansion during all of the preceding operations. This further automates backup management across a storage network and relieves the user from the burden of being directly involved in the coordination of backup resources.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising: program instructions for allocating a plurality of backup LUNs identified in a backup management file from a plurality of available LUNs identified in a universe file such that the backup management file identifies a plurality of data containers currently available for backup, where each of the plurality of the data containers in the backup management file specifies a subset comprising more than one of the plurality of backup LUNs, the subset being currently capable of backing up a dataset, the dataset being stored on a plurality of used dataset LUNs, and the universe file identifies the plurality of available LUNs for use in a current backup; and program instructions for allocating one of the plurality of data containers for the current backup of the dataset; wherein allocating the plurality of backup LUNs comprises querying the dataset comprising the plurality of used dataset LUNs to determine a dataset size of the plurality of used dataset LUNs and allocating the plurality of backup LUNs based on the dataset size and a backup size of each of the available LUNs used in the context of storage subsystem rules for matching to create each of the plurality of the data containers identified in the backup management file.

2. The computer program of claim 1, wherein one or more additional available LUNs are added to the universe file by a user.

3. The computer program of claim 1, wherein allocating the plurality of backup LUNs and allocating the one of the plurality of the data containers for the current backup of the dataset are performed in response to a backup request.

4. The computer program of claim 1, wherein allocating the plurality of backup LUNs comprises creating the backup management file.

5. The computer program of claim 1, wherein the data containers are substantially equivalent in size.

6. The computer program of claim 1, further comprising program instructions for specifying current status of each of the data containers in the backup management file; wherein the current status specifies whether the data container is in use.

7. The computer program of claim 1, wherein allocating the plurality of backup LUNs comprises determining that the plurality of backup LUNs are currently identified in the universe file.

8. The computer program of claim 1, wherein the backup management file further comprises a plurality of free LUNs from the plurality of available LUNs identified in the universe file.

9. The computer program of claim 1, further comprising program instructions for scanning a storage area network to identify the one or more available LUNs and generate the universe file.

10. A method, comprising: programmatically allocating with a processor a plurality of backup LUNs identified in a backup management file from a plurality of available LUNs identified in a universe file such that the backup management file identifies a plurality of data containers currently available for backup, where each of the plurality of the data containers in the backup management file specifies a subset comprising more than one of the plurality of backup LUNs, the subset being currently capable of backing up a dataset, the dataset being stored on a plurality of used dataset LUNs, and the universe file identifies the plurality of available LUNs for use in a current backup; and programmatically allocating with the processor one of the plurality of data containers for the current backup of the dataset; wherein allocating the plurality of backup LUNs comprises querying the dataset comprising the plurality of used dataset LUNs to determine a dataset size of the plurality of used dataset LUNs and allocating the plurality of backup LUNs based on the dataset size and a backup size of each of the available LUNs used in the context of storage subsystem rules for matching to create each of the plurality of the data containers identified in the backup management file.

11. The method of claim 10, wherein one or more additional available LUNs are added to the universe file by a user.

12. The method of claim 10, wherein allocating the plurality of backup LUNs and allocating the one of the plurality of the data containers for the current backup of the dataset are performed in response to a backup request.

13. The method of claim 10, wherein allocating the plurality of backup LUNs comprises creating the backup management file.

14. The method of claim 10, wherein the data containers are substantially equivalent in size.

15. The method of claim 10, further comprising specifying current status of each of the data containers in the backup management file;
   wherein the current status specifies whether the data container is in use.

16. The method of claim 10, wherein allocating the plurality of backup LUNs comprises determining that the plurality of backup LUNs are currently identified in the universe file.

17. The method of claim 10, wherein the backup management file further comprises a plurality of free LUNs from the plurality of available LUNs identified in the universe file.

18. The method of claim 10, further comprising scanning a storage area network to identify the plurality of available LUNs and generate the universe file.

* * * * *